US009028641B2

(12) United States Patent
Sano et al.

(10) Patent No.: US 9,028,641 B2
(45) Date of Patent: May 12, 2015

(54) METHOD FOR MANUFACTURING LABEL AND APPARATUS FOR MANUFACTURING THE LABEL

(75) Inventors: Tomohumi Sano, Iruma (JP); Tadahiro Tsubaki, Tokorozawa (JP); Toshiaki Kanamura, Ome (JP)

(73) Assignees: Casio Electronics Manufacturing Co., Ltd., Iruma-shi (JP); Casio Computer Co., Ltd., Tokyo (JP)

(*) Notice: Subject to any disclaimer, the term of this patent is extended or adjusted under 35 U.S.C. 154(b) by 201 days.

(21) Appl. No.: 13/343,275

(22) Filed: Jan. 4, 2012

(65) Prior Publication Data

US 2012/0175054 A1 Jul. 12, 2012

(30) Foreign Application Priority Data

Jan. 6, 2011 (JP) ................................ 2011-001251

(51) Int. Cl.
*B32B 37/12* (2006.01)
*G03G 15/20* (2006.01)
*G03G 15/00* (2006.01)

(52) U.S. Cl.
CPC ........ *G03G 15/2007* (2013.01); *G03G 15/6591* (2013.01)

(58) Field of Classification Search
CPC ....................... G03G 15/6588; G03G 15/2007
USPC ........................................... 156/275.5, 379.6
See application file for complete search history.

(56) References Cited

U.S. PATENT DOCUMENTS

| | | | | |
|---|---|---|---|---|
| 2004/0253733 | A1* | 12/2004 | Prusik et al. | 436/2 |
| 2007/0031650 | A1* | 2/2007 | Kobayashi et al. | 428/323 |
| 2009/0233209 | A1* | 9/2009 | Daifuku et al. | 430/108.21 |

FOREIGN PATENT DOCUMENTS

| | | | |
|---|---|---|---|
| JP | 8-123063 | A | 5/1996 |
| JP | 9-168998 | A | 6/1997 |
| JP | 11-33999 | A | 2/1999 |
| JP | 3543554 | B2 | 4/2004 |
| JP | 2005-325249 | A | 11/2005 |
| JP | 2006-126359 | A | 5/2006 |
| JP | 2006-330072 | A | 12/2006 |
| JP | 2007-070521 | A | 3/2007 |
| JP | 2007-283745 | A | 11/2007 |
| JP | 2007283745 | A * | 11/2007 |

(Continued)

OTHER PUBLICATIONS

JP 2010-184470A English machine translation, Aug. 2010.*

(Continued)

*Primary Examiner* — Richard Crispino
*Assistant Examiner* — Elizabeth Royston
(74) *Attorney, Agent, or Firm* — Holtz, Holtz, Goodman & Chick PC

(57) ABSTRACT

Disclosed is a method and apparatus for manufacturing a label including providing a release sheet having an adhesive layer on a releasable surface thereof, forming the film-like label portion by electrophotography which includes developing a latent image using the label forming composition to form a solid image of a label shape on a photoconductor, transferring the developed image on the adhesive layer of the release sheet, and fixing the transferred image by applying heat and pressure thereto, and irradiating the film-like label portion and an exposed portion of the adhesive layer other than the film-like label portion with rays to cure the exposed portion.

12 Claims, 2 Drawing Sheets

(56) References Cited

FOREIGN PATENT DOCUMENTS

| | | | | |
|---|---|---|---|---|
| JP | 2008-233602 | | | 10/2008 |
| JP | 2008-250171 | A | | 10/2008 |
| JP | 2009-175632 | A | | 8/2009 |
| JP | 2009230064 | A | * | 10/2009 |
| JP | 2010079008 | A | * | 4/2010 |
| JP | 2010184470 | A | * | 8/2010 |
| JP | 4765810 | B2 | | 6/2011 |

OTHER PUBLICATIONS

Japanese Office Action dated Feb. 12, 2013 (and English translation thereof) in counterpart Japanese Application No. 2011-001251.

* cited by examiner

METHOD FOR MANUFACTURING LABEL AND APPARATUS FOR MANUFACTURING THE LABEL

CROSS-REFERENCE TO RELATED APPLICATIONS

This application is based upon and claims the benefit of priority from prior Japanese Patent Application No. 2011-001251, filed Jan. 6, 2011, the entire contents of which are incorporated herein by reference.

BACKGROUND OF THE INVENTION

1. Field of the Invention

The present invention relates to a method for manufacturing a label and an apparatus for manufacturing the label. In particular, the present invention relates to a method for manufacturing a label and an apparatus for manufacturing the label using electrophotography.

2. Description of the Related Art

Methods of manufacturing a label, in which a label sheet adhered to a release sheet is printed with a pattern and a label of a desired shape is cut out using a cutting die, are disclosed in JP-A 09-168998 and JP-A 11-033999. In these method disclosed in JP-A 09-168998 and JP-A 11-033999, it is necessary to produce a printing pattern and cutting die in order to manufacture one kind of label. Further, though these methods are effective for manufacturing a large number of labels, manufacturing costs of a printing pattern and a cutting die are high even in the case of manufacturing a small number of labels, and as a result, a cost of the label becomes high.

The present applicant proposed a method for manufacturing a label using electrophotography which includes transferring a toner-like composition of a desired pattern to a release paper having an adhesive layer thereon, and heating the release paper to manufactured a label, as disclosed in Japanese Patent No. 4765810. This method is superior in that a label of a desired shape can be manufactured on demand.

This method, however, has a problem to be solved, in which, when the manufactured label is released from the release paper, the exposed portion of the adhesive layer on which the label is not formed, is not separated from the portion of the adhesive layer on the back of the label, and the excess adhesive agent follows the label and is released from the release paper, thus causing a trouble of handling.

BRIEF SUMMARY OF THE INVENTION

It is an object of the present invention to provide a method for manufacturing a label and an apparatus for manufacturing the label, in which, when a label is released from a release paper, an excess adhesive agent does not follow the label, and therefore, handling is easy.

According to one aspect of the present invention, there is provided a method for manufacturing a label comprising: providing a release sheet having a releasable surface on which an adhesive layer is formed, the adhesive layer having an adhesive property which decreases with curing of the adhesive layer when it is irradiated with rays; fixing a label forming composition containing rays absorbing material to form a film-like label portion; and irradiating the film-like label portion and an exposed portion of the adhesive layer other than the film-like label portion with rays to cure the exposed portion of the adhesive layer.

In the method for manufacturing a label described above, the rays may be ultraviolet rays. The adhesive agent may be an ultraviolet curable adhesive agent containing an ultraviolet curable resin and an ultraviolet polymerization initiator. The rays absorbing material may be titan dioxide or an organic ultraviolet absorbing agent. The label forming composition may be a toner containing polylactic acid as a binder resin.

In the method for manufacturing a label described above, forming the film-like label portion may be performed by electrophotography which includes developing a latent image using the label forming composition to form a solid image of a label shape on a photoconductor, transferring the developed image on the adhesive layer of the release sheet, and fixing the transferred image by applying heat and pressure thereto.

According to another aspect of the present invention, there is provided an apparatus for manufacturing a label comprising: a sheet providing section for providing a release sheet having an adhesive layer on a releasable surface thereof, the adhesive layer having an adhesive property which decreases with curing of the adhesive layer when it is irradiated with rays; a fixing section for fixing a label forming composition containing rays absorbing material to form a film-like label portion; and rays irradiating section for irradiating the film-like label portion and an exposed portion of the adhesive layer other than the film-like label portion with rays to cure the exposed portion of the adhesive layer.

In the apparatus for manufacturing a label described above, the rays may be ultraviolet rays. The adhesive agent may be an ultraviolet curable adhesive agent containing an ultraviolet curable resin and an ultraviolet polymerization initiator. The rays absorbing material may be titan dioxide or an organic ultraviolet absorbing agent. The label forming composition may be a toner containing polylactic acid as a binder resin.

In the apparatus for manufacturing a label described above, forming the film-like label portion may be performed by electrophotography which includes developing a latent image using the label forming composition to form a solid image of a label shape on a photoconductor, transferring the developed image on the adhesive layer of the release sheet, and fixing the transferred image by applying heat and pressure thereto.

According to the method and apparatus for manufacturing a label described above, when a label is released from a release paper, an excess adhesive agent does not follow the label, and therefore, handling thereof is easy.

BRIEF DESCRIPTION OF THE SEVERAL VIEWS OF THE DRAWING

A more complete understanding of this application can be obtained when the following detailed description is considered in conjunction with the following drawings, in which.

DETAILED DESCRIPTION OF THE INVENTION

Embodiments of the present invention will be explained in reference to the drawings.

Figure 1:
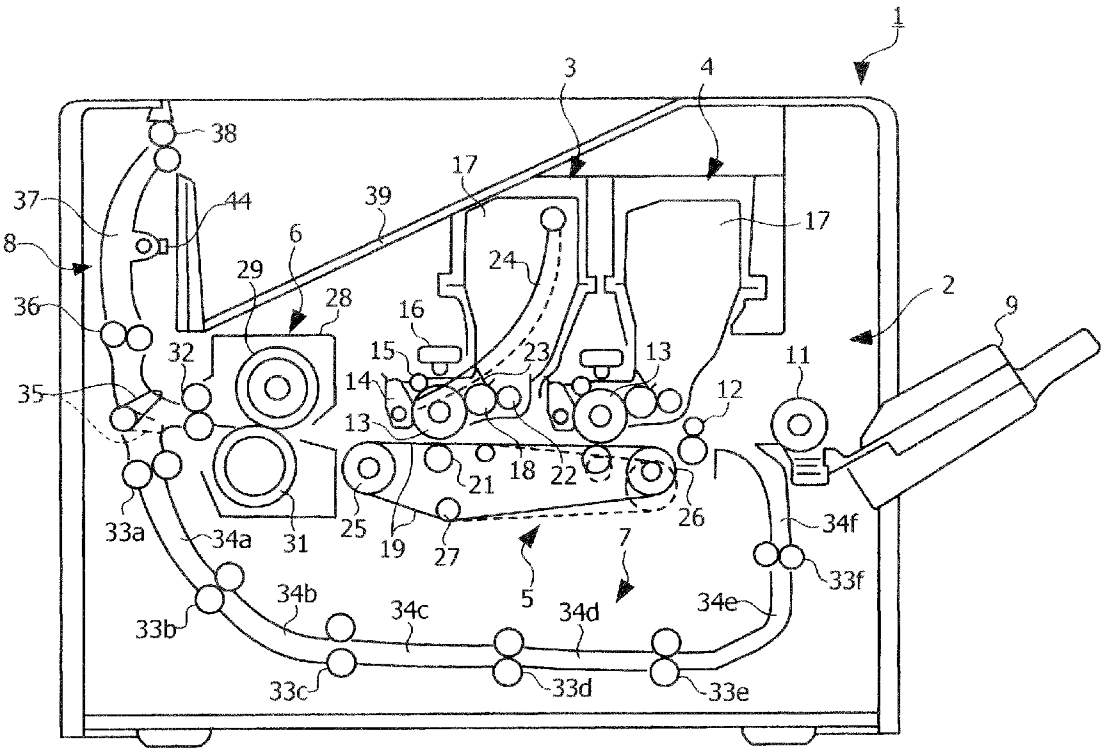
FIG. 1 is a view schematically illustrating the label manufacturing apparatus according to one embodiment of the present invention.

FIG. 1 is a sectional view showing a inner structure of the label manufacturing apparatus according to one embodiment of the present invention. As shown in FIG. 1, the label manufacturing apparatus 1 includes a paper feed section 2, a label forming section 3, a printing section 4, a conveyance section 5, a fixing section 6, a recycling mechanism 7, a discharge section 8, and the like.

The paper feed section 2 includes a paper feed tray 9 overhanging obliquely upward from the side of the label manufacturing apparatus 1, a paper feed roll 11 arranged on the paper feed inlet of the paper feed section 2, and a pair of stand-by rolls 12. Release papers each coated with an adhesive agent are placed on the paper feed tray 9 one by one.

The label forming section 3 is constituted by a photoconductive drum 13, a cleaner 14 arranged along the peripheral surface of the photoconductive drum 13 so as to surround the photoconductive drum 13, an initializing charger 15, an optical recording head 16, a powder hopper 17, a developing roll 18 rotatably supported on the lower opening of the powder hopper 17, a upper conveying surface of a conveyer belt 19, and a transfer roll 21 pressed on the lower surface of photoconductive drum 13 with the upper conveying surface of a conveyor belt 19 interposed therebetween.

A composition for forming the label (hereafter called label-forming toner) is contained in the powder hopper 17. A powder supply roll 22 is arranged in contact with the developing roll 18 so as to be buried in the label-forming toner. A doctor blade 23 is arranged above the powder supply roll 22 and in contact with the developing roll 18.

A recovering pipe 24 is disposed between the cleaner 14 and the powder hopper 17. The recovering pipe 24 includes a long conveying screw, and recovers the label-forming toner, which is cleaned off from the photoconductive drum 13 and deposited in the cleaner 14, in the powder hopper 17.

The printing section 4 has the same structure as that of the label forming section 3 except it does not include recovering pipe 24, and the powder hopper 17 contains a black toner for printing in place of the label-forming toner.

The conveyance section 5 is constituted by the conveyer belt 19 described above, a drive roll 25 and follower roll 26 with the conveyer belt 19 stretched therebetween, a tension roll 27 stretching the conveyer belt 19 tight, a pivot mechanism not shown in FIG. 1, for contacting or separating the upstream portion of the conveyer belt 19 in the conveying direction (right direction in FIG. 1) with or from the photoconductive drum 13 of the printing section 4, and so on.

The fixing section 6 is constituted by an insulated housing 28, a heating roll 29 and press roll 31, which are opposed to each other and surrounded by the insulated housing 28, a carry-out roll 32 arranged on the downstream side (left direction in FIG. 1) of the heating roll 29 and press roll 31.

The recycling mechanism 7 includes six pairs of recycling rolls 33 (33*a*-33*f*) arranged between the carry-out roll 32 of the fixing section 6 and the stand-by rolls 12 at nearly equal intervals, and recycle guide path 34 (34*a*-34*f*) arranged ahead of the pairs of the recycling rolls 33.

The discharge section 8 is constituted by a change-over flap 35 arranged just behind the carry-out roll 32 of the fixing section 6, a pair of conveying rolls 36 arranged on the downstream and upper side of the change-over flap 35, a paper discharge guide path 37, a pair of paper discharge rolls 38 arranged at the end of the paper discharge guide path 37, and a paper discharge tray 39 formed on the upper surface of the label manufacturing apparatus 1 and arranged obliquely upward from the outside of the pair of paper discharge rolls 38.

Further, the label manufacturing apparatus 1 includes an ultraviolet rays irradiating unit 44 for irradiating the release paper with ultraviolet rays to cure that exposed portion of the adhesive layer on which the label is not formed.

Incidentally, ultraviolet rays refer to a ray of wavelength between 100 nm and 400 nm. In the present embodiment, the ultraviolet rays irradiating unit 44 includes a metal halide lamp emitting a ray of wavelength between 200 nm and 400 nm. A high pressure mercury lamp emitting ultraviolet rays of wavelength of 365 nm may be used as the ultraviolet rays irradiating unit 44. Furthermore, an UV-LED may be used.

FIGS. 2A to 2F are views schematically showing a process of manufacturing a label by the label manufacturing apparatus described above. The process of manufacturing a label is explained in reference to FIGS. 2A to 2F.

Figure 2A:
FIGS. 2A, 2B, 2C, 2D, 2E and 2F are views illustrating process for manufacturing the label by means of the apparatus shown in FIG. 1.

FIG. 2A shows a release paper coated with an adhesive agent, which is to be placed on the paper supply tray 9 of the label manufacturing apparatus 1. As shown in FIG. 2A, the adhesive agent 41 is applied in advance on the upper surface of the release paper 40. The adhesive agent 41 can be cured by irradiation with ultraviolet rays.

The curing by irradiation with ultraviolet rays is defined as a method of curing a resin by irradiating the resin containing a prepolymer, monomer, photopolymerization initiator, and additives with ultraviolet rays of wavelength between 200 nm and 400 nm for a short time (several seconds to several ten seconds).

An adhesive agent containing a photopolymerization initiator can be used as the adhesive agent 41 curable by irradiation with ultraviolet rays. The photopolymerization initiator can be excited by irradiation with ultraviolet rays to generate radicals and ions, thereby to initiate polymerization of oligomers and monomers contained in the adhesive agent and to cure them. The photopolymerization initiator includes benzophenone series, acetophenone series, benzoin series, benzyl series, triazine series, oxetane series, and so on. The concrete example of the photopolymerization initiator includes 2,2-dimethoxy-2-phenylacetophenone.

The content of the photopolymerization initiator ranges between 0.1 and 10% by mass based on a mass of the adhesive agent. When the content of the photopolymerization initiator is less than 0.1% by mass, the effect of curing the adhesive agent may become insufficient, and adhesive property may be maintained. When the content of the photopolymerization initiator is more than 10% by mass, the photopolymerization initiator may remain in the adhesive agent to lower an adhesive force of the adhesive agent.

The concrete example of the adhesive agent curable by irradiation with ultraviolet rays includes a solution prepared by dissolving a base resin containing an ultraviolet curing resin, crosslinking agent and ultraviolet polymerization initiator in a solvent. This adhesive agent is cured by irradiation with ultraviolet rays to lose an adhesive property.

The release paper 40 having the adhesive agent thereon (refer to release paper 40 hereinafter) is introduced into the label manufacturing apparatus by means of the paper supply roll 11, and conveyed to the stand-by rolls 12. When the rotation of the stand-by rolls 12 is stopped, the tip end of the release paper 40 abuts on the nip of the stand-by rolls 12 and is inhibited to run. Then, timing of the conveyance is stand-by condition.

At first, application of developing bias to the developing roll 18 and application of transfer bias to the transfer roll 21 are stopped in the printing section 4 (or biases of reverse potential are applied). Accordingly, printing function of the printing section 4 using a black toner is stopped.

When the printing function stops, the upstream side of the conveyer belt 19 in the conveying direction shifts to a stand-by position shown by a dotted line in FIG. 1 by means of a pivot mechanism not shown in FIG. 1. As a result, the upper conveying surface of the conveyer belt 19 abuts on only the photoconductive drum 13 in the label forming section 3.

In this state, the photoconductive drum 13 rotates in a clockwise direction in the label forming section 3. The initializing charger 15 applies uniform high negative charges to the circumference surface of the photoconductive drum 13. The photoconductive drum 13 is exposed to a light corresponding to an exposure signal by means of the optical recording head 16 to form a low potential portion.

As a result, an electrostatic latent image formed of a high negative potential portion due to initialization and a low negative potential portion due to exposure is formed in a state developed to a desired shape.

The powder supply roll 22 supplies the label-forming toner to the developing roll 18 so that the label-forming toner is rubbed and fixed on the developing roll 18. The doctor blade 23 restricts the label-forming toner on the developing roll 18 to a constant film thickness. Then, the label-forming toner is charged to a low negative potential generated by friction and is fixed on the surface of the developing roll 18.

The developing roll 18 conveys the label-forming toner fixed to the surface thereof and having a constant film thickness during rotation. A developing bias of, for example, −250 V is impressed on the developing roll 18 from the bias source not shown in FIG. 1. The low potential portion of the electrostatic latent image on the photoconductive drum 13 is lowered to, for example, −70 V owing to the exposure.

As a result, a potential difference of −180 V is generated between the photoconductive drum 13 and the developing roll 18. That is, the low potential portion of the electrostatic latent image produces a positive potential with regard to the developing roll 18.

Owing to this potential difference, the label-forming toner charged to a negative potential is transferred to the low positive potential portion of the electrostatic latent image on the photoconductive drum 13 to form a solid image developed to a desired shape of the label-forming toner (reverse development).

The solid image developed in a desired shape using the label forming toner is conveyed to the transfer section of the transfer roll 21 opposed to the photoconductive drum 13 by rotation of the photoconductive drum 13. When the tip end of the solid image of the label forming toner arrives at that position of the circumferential surface of the photoconductive drum 13 which opposes to the transfer roll 21, the release paper 40 is conveyed to the position. The transfer roll 21 applies transfer current (or transfer voltage) to the release paper 40 through the conveyer belt 19 from a transfer bias source not shown in FIG. 1. Owing to this application of transfer bias, the solid image of the label forming toner on the photoconductive drum 13 is transferred to the release paper 40.

Polylactic acid particles having additives attached to the surfaces thereof may be used as the label forming toner. The label forming toner may contain ultraviolet absorbing material such as titan dioxide or organic ultraviolet absorbing agent. Where the label forming toner contains the ultraviolet absorbing material, ultraviolet rays are absorbed in the label ultraviolet rays irradiation step, so that ultraviolet rays do not arrive at the back of the label. For that reason, adhesive force of the adhesive agent 41 on the back of the label can be retained.

The content of the organic ultraviolet absorbing agent to be added to the label forming toner is preferably 0.1 to 10% by mass based on a mass of the label forming toner. When the content of the ultraviolet absorbing agent is less than 0.1% by mass, the effect of adding of the ultraviolet absorbing agent may be insufficient, and adhesive force of the adhesive agent 41 on the back of the label is inclined to drop. On the other hand, even if the content of the ultraviolet absorbing agent is more than 10% by mass, more effects may not be obtained. When titan oxide is used as the ultraviolet absorbing agent, the content is preferably 1 to 30% by mass.

Polylactic acid to be contained in the label forming toner as a main component has preferably a weight-average molecular weight of 100,000 or more. Since polylactic acid having a weight-average molecular weight of 150,000 or more provides a label having a particularly high strength, it is more preferable. When polylactic acid having a weight-average molecular weight of 100,000 or less is used, in some cases, it may not be possible to obtain a label having a sufficient strength.

It is particularly preferable to use polylactic acid having a molecular weight which is increased by crosslinking using a crosslinking agent in polymerization process. Since, the molecular weight can be increased without extremely elevating a softening point by crosslinking polylactic acid, it is possible to increase the strength of the label. The crosslinking agent includes ethylene glycol and a castor oil. In particular, a castor oil is preferable.

According to the findings of the present inventors, a toner produced by a pulverizing process, which is most widely employed, is not always proper. In the toner produced by pulverizing process, it is necessary to uses a fragile kneaded mass containing a resin as a main component. When the fragile kneaded mass is used as a binder resin of the label forming toner, however, the produced toner itself is fragile, and has not sufficiently high strength. Therefore, it is preferred to use a toner produced by the other methods than a pulverizing process.

Those methods include a spray dry method, dissolution emulsion method, and an aqueous resin kneading method. The spray dry method is a method in which a solution obtained by dissolving toner components in a solvent is sprayed to form toner particles. The spray dry method is disclosed in JP-A 2009-175632.

The dissolution emulsion method is a method in which a solution obtained by dissolving a resin in a solvent is dispersed in water and is precipitated to form toner particles. This method has the advantage that a toner can be produced irrespective of employing a fragile resin. The dissolution emulsion method is disclosed in JP. 3543554.

The aqueous resin kneading method is a method in which toner components are dispersed in an aqueous resin, and thus formed dispersion is kneaded and is rinsed in water. The aqueous resin kneading method is disclosed in JP-A 2006-126359.

Figure 2B:
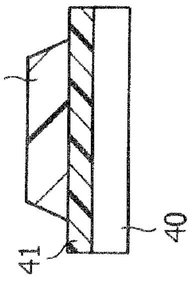

FIG. 2B shows a state in which a solid image 42 of a label forming toner is transferred to a surface of an adhesive agent 41 of a release paper 40. That portion of the label forming toner which is not transferred to the surface of the adhesive agent 41 and remains on the photoconductive drum 13, is removed from the circumferential surface of the photoconductive drum 13 by means of the cleaner 14 and is recovered in the powder hopper 17 through the recovery pipe installed in the conveying screw.

The release paper 40 having the solid image 42 of the label forming toner thereon is conveyed to the fixing section 6 in which the solid image 42 of the label forming toner is heated by the heating roll 29, is pressed by the press roll 31 to form a film-like label, and is fixed on the surface of the adhesive agent 41.

Figure 2C:
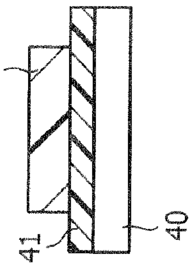

FIG. 2C shows a state in which the solid image 42 of the label forming toner is fixed on the adhesive agent 41 of the release paper 40 to become a film-like label 42'. Since the change-over flap 35 is pivoted to a position of a solid line directed obliquely upward, the release paper 40 having the film-like label 42' fixed on the adhesive agent 41 is conveyed to the recycling mechanism 7.

The release paper 40 conveyed to the recycling mechanism 7 is recycled to the pairs of the stand-by rolls 12 by means of 6 pairs of the recycle rolls 33 (33*a* to 33*f*) and six recycle guides.

At this position, application of the developing bias to the developing roll 18 in the label forming section 3 and application of the transfer bias to the transfer roll 21 are stopped (or reverse biases are applied) and thus the function of forming the film-like label is stopped.

In the printing section 4, the application of the developing bias to the developing roll 18 and the application of the transfer bias to the transfer roll 21 are started to exercise a printing function using black toner. With the exercise of the printing function, the upstream side of the conveying belt 19 is pivoted to a position of the solid line shown in FIG. 1 by means of a pivoting mechanism not shown in FIG. 1, and the upper conveying surface of the conveying belt 19 is brought into contact with the photoconductive drum 13 in the printing section 4.

Thereafter, an image of the black toner developed according to desired printing data is transferred to the surface of the above-described film-like label 42' in the same manner as in the transfer of the solid image of the label forming toner in the label forming section 3 described above. Incidentally, the forming method of the image on the film-like label 42' is not limited to electrophotography, and may be an ink-jet method.

Figure 2D:
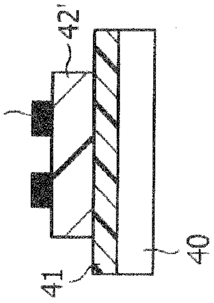

FIG. 2D shows a state in which the image 43 of the black toner developed according to desired printing data is transferred to the film-like label 42' formed on the surface of the adhesive agent 41 of the release paper 40. The release paper 40 having the film-like label 42' on which the image 43 of the black toner developed according to desired printing data is transferred is conveyed to the fixing section 6 in which the image 43 developed according to desired printing data is fixed to the film-like label 42' by applying heat and pressure thereto.

Figure 2E:
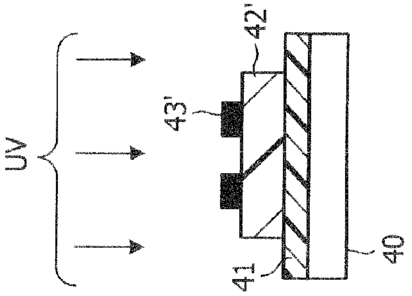

FIG. 2E shows a state in which the image 43 developed according to desired printing data is fixed as a fixed image 43' to the film-like label 42' formed on the surface of the adhesive agent 41 of the release paper 40. The release paper 40 having the fixed image 43' formed thereon is discharged to the paper discharge tray 39 through a pair of conveying rolls 36, the paper discharge guide path 37, and a pair of paper discharge rolls 38, by pivoting the change-over flap 35 to a position of a dotted line extending in a horizontal direction.

Figure 2F:
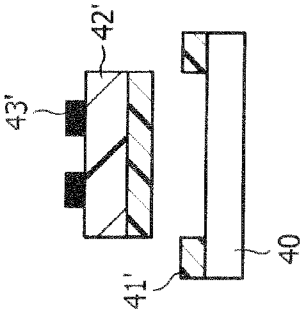

Then, when the release paper 40 is discharged, the film-like label 42' formed on the surface of the adhesive agent of the release paper 40 is irradiated with ultraviolet rays from the ultraviolet rays irradiating unit 44 in the direction shown in the arrow, thus curing the exposed surface 41' of the adhesive agent 41. Accordingly, the exposed surface 41' of the adhesive agent 41 loses an adhesive force. As a result, when the film-like label 42' having the fixed image 43' on the front and the adhesive agent 41 on the back is released from the release paper 40, the cured exposed surface 41' of the adhesive agent 41 is separated from the adhesive agent on the back of the film-like label 42' and the film-like label 42' has not excess adhesive agent, as shown in FIG. 2F.

Since the label 42' contains UV absorbing material, ultraviolet rays irradiating the label 42' is absorbed in the ultraviolet absorbing material, and adhesive force of the adhesive agent attached on the back of the label 42' is not lowered and is maintained. As a result, it is possible to attached to a desired member with a strong adhesive force and without a hitch.

Though, in the label forming process described above, the image 43 developed according to the printing data is formed on the label 42', the image 43 may be formed on the surface of the adhesive agent 41 of the release paper 40. In either order, it is possible to release the label 42' from the release paper 40 without a hitch by irradiating the exposed surface 41' with ultraviolet rays to cure it.

There will be described Examples of the present invention and Comparative Examples, thereby explaining the present invention more concretely.

Methods for measuring physical properties of materials used in each Example are shown as follows.

<Measurement of Particle Diameter of Toners>

Apparatus: Multisizer II (Beckmann Coulter Co., Ltd.)

Sample: A small amount of sample, purified water, and a surfactant are poured into a beaker and dispersed by means of a ultrasonic cleaning machine.

Measurement: A volume average particle diameter is measured using Multisizer II with an aperture size of 100 μm and count number of 50,000.

<Measurement of Molecular Weight>

Apparatus: GPC (Shimadzu Co., Ltd.)

Weight average molecular weight is measured using a calibration curve prepared using polyethylene sample having a known molecular weight as a standard by means of gel-permeation chromatography.

<Synthesis of Polylactic Acid>

Example of Synthesis

100% by mass of L-lactide (Purack Japan Co., Ltd.) and 0.10% by mass of stearyl alcohol were stirred in nitrogen atmosphere at a temperature of 190° C. 0.05% by mass of tin octylate was added to the mixture and stirred for 2 hours at a temperature of 190° C.

Thereafter, stirring was continued for 1 hour at a reduced pressure of 10 mmHg in order to remove residual L-lactide. As a result, polylactic acid having a weight average molecular weight Mw of 272,000 was obtained.

Preparation Example 1 of Label Forming Toner

Polylactic acid produced in Example of Synthesis was mixed with polyethylene glycol resin. The mixture was kneaded in a extrusion kneader. The kneaded mass was immersed in water to resolve polyethylene glycol resin in water.

Then, the precipitated polylactic acid particles was collected and dispersed in a deionized water again. The same washing operation was repeated seven times. Thus washed polylactic acid particles were passed through a mesh having an opening of 32 μm to remove coarse particles.

Subsequently, 0.5 mass parts of hydrophobic-treated silica particles (TG810G; Cabot Co., Ltd.) and 3 mass parts of RY 50 (Nippon Aerosil Co., Ltd.) were added to 100 mass parts of dry polylactic acid particles and the mixture is stirred, thus obtained polylactic acid toner 1 having a volume average diameter D50 of 27 μm.

Preparation Example 2 of Label Forming Toner

Polylactic acid toner 2 having a volume average diameter D50 of 24 μm was prepared in the same manner as Preparation Example 1 except 90 mass parts of polylactic acid produced in Example of Synthesis and 10 mass parts of titan dioxide (Ishihara Sangyo Co., Ltd.) were mixed with polyethylene glycol resin.

Preparation Example 3 of Label Forming Toner

Polylactic acid toner 3 having a volume average diameter D50 of 27 μm was prepared in the same manner as Preparation Example 1 except 97 mass parts of polylactic acid produced in Example of Synthesis and 3 mass parts of ultraviolet absorbing agent (TINUVIN 928; Ciba Japan Co., Ltd.) were mixed with polyethylene glycol resin.

<Production of Ultraviolet Curing Adhesive Agent>

30% by mass of 2-ethylhexylacrylate, 70% by mass of vinyl acetate, and 1% by mass of 2-hydroxyethylmethacrylate were subjected to solution polymerization in toluene solution to produce a base resin having a weight average molecular weight Mw of 150,000. 100 mass parts of the base resin, 100 mass parts of bifunctional urethane acrylate (Mitsubishi Rayon Co., Ltd.; weight average molecular weight of 11,000) as an ultraviolet curing agent, 15 mass parts of polyhydric alcohol (Colonate L; Nippon Polyurethane Industry Co., Ltd.) as a crosslinking agent, and 5 mass parts of 2,2-dimethoxy-2-phenylacetophenone as a UV polymerization initiator were dissolved in ethyl acetate to obtain a solution of UV curable adhesive agent.

<Manufacture of Label Mount>

Manufacture Example 1 of Label Mount

After the above-described solution of UV curable adhesive agent was applied on the release paper (SHA70; San A kaken Co., Ltd.) and the formed adhesive agent layer was dried to remove ethyl acetate, a hexane solution of cycloolefine copolymer resin (S8007: Ticona Co., Ltd.) was applied on the adhesive agent layer and the formed resin layer was dried to remove hexane, thus manufacturing a label mount 1.

Manufacture Example 2 of Label Mount

A label mount 2 was manufactured in the same manner except a conventional spray type adhesive agent ("55": 3M Co., Ltd.) was employed in place of the UV curable adhesive agent described above.

Example 1

A latent image was developed using the toner 2 obtained in Preparation Example 2 of label forming toner by electrophotography to form a toner image on the label mount 1 of A size. Thereafter, the toner image was heat-pressed at a temperature of 200° C. to form a label on the label mount 1. Then, an image was printed on the label using the UV curable ink-jet printer (Versa UVLEC-300A: Roland DG Co., Ltd.). The image was irradiated with ultraviolet rays and was fixed to the label.

In thus manufactured label, when the label was released from the label amount 1, the adhesive layer released from the release paper was attached to the back of the label and was separated from the other portion of the adhesive layer around the label. It was not found that excess adhesive agent was followed by the other portion of the adhesive layer around the label and was attached to the label.

Adhesive force of the adhesive layer in the back of the label remained strong without loss irrespective of irradiation of ultraviolet rays.

Example 2

A label was manufactured in the same manner as Example 1 except that the toner 2 was changed to the toner 3. It was not found that excess adhesive agent was attached to the label. Adhesive force of the adhesive layer in the back of the label remained strong like Example 1.

Comparative Example 1

A label was manufactured in the same manner as Example 1 except that the toner 2 was changed to the toner 1 and the label mount 1 wad changed to the label mount 2, and ultraviolet rays irradiation was not performed. When the label was released from the label amount 1, excess adhesive agent remained on the back of the label in comparison with Example 1 and Example 2.

Comparative Example 2

A label was manufactured in the same manner as Example 1 except that the toner 2 was changed to the toner 1. When the label was released from the label amount 1, it was not found that excess adhesive agent was attached to the label. However, adhesive force of the adhesive layer in the back of the label was low in comparison with Example 1, Example 2, and Comparative Example 1.

The results of aforementioned Examples and Comparative Examples are shown in the following Table 1.

TABLE 1

| | Toner | Additive | Label mount | Adhesive agent | Excess adhesive agent | Adhesive force |
|---|---|---|---|---|---|---|
| Example 1 | 2 | Titan dioxide | 1 | UV curable | ○ | ◎ |
| Example 2 | 3 | Organic UV absorbing agent | 1 | UV curable | ○ | ◎ |
| Comparative Example 1 | 1 | None | 2 | Ordinary | X | ◎ |
| Comparative Example 2 | 1 | None | 1 | UV curable | ○ | Δ |

As shown in Table 1, when the label was released from the label amount, excess adhesive agent was not found on the back of the labels of Examples 1 and 2 manufactured using the label mount having the UV curable adhesive layer, and the label forming toner containing UV absorbing material. Further, adhesive force of the adhesive layer on the back of the label remained strong.

On the other hand, when the label was released from the label amount, excess adhesive agent was found on the back of the label of Comparative Examples 1 manufactured using the label mount having the conventional adhesive layer.

Furthermore, excess adhesive agent was not found on the back of the label of Comparative Examples 2 manufactured using the label mount having the UV curable adhesive layer, and the label forming toner not containing UV absorbing material. However, adhesive force of the adhesive layer in the back of the label was low.

Having described and illustrated the principles of this application by reference to one preferred embodiment. It should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A method for manufacturing a label comprising:

providing a release sheet having a releasable surface on which an adhesive layer is formed, the adhesive layer having an adhesive property which decreases with curing of the adhesive layer when it is irradiated with ultraviolet rays;

fixing a print image forming composition on the adhesive layer to form a print image portion, and then fixing a label forming composition so as to cover the print image portion to form a film-like label portion, the label forming composition containing titanium dioxide or an organic ultraviolet absorbing agent; and irradiating the film-like label portion and an exposed portion of the adhesive layer other than the film-like label portion with ultraviolet rays to cure the exposed portion of the adhesive layer.

2. The method according to claim 1, wherein an adhesive agent of the adhesive layer is an ultraviolet curable adhesive agent containing an ultraviolet curable resin and an ultraviolet polymerization initiator.

3. The method according to claim 1, wherein the label forming composition is a toner containing polylactic acid as a binder resin.

4. The method according to claim 1, wherein forming the film-like label portion is performed by electrophotography which includes developing a latent image using the label forming composition to form a solid image of a label shape on a photoconductor, transferring the developed image on the adhesive layer of the release sheet and the print image portion, and fixing the transferred image by applying heat and pressure thereto.

5. The method according to claim 1, wherein the ultraviolet rays have a wavelength between 200 nm and 400 nm.

6. The method according to claim 1, wherein the ultraviolet rays are emitted by a metal halide lamp, a high pressure mercury lamp, or a UV-LED.

7. The method according to claim 1, wherein the label forming composition contains an organic ultraviolet absorbing agent in an amount of 0.1 to 10% by mass based on a mass of the label forming composition.

8. The method according to claim 1, wherein the label forming composition contains titanium dioxide in an amount of 1 to 30% by mass based on a mass of the label forming composition.

9. The method according to claim 1, wherein the label forming composition is produced by a spray dry method, a dissolution emulsion method, or an aqueous resin kneading method.

10. The method according to claim 1, wherein the label forming composition contains polylactic acid as a main component, and the polylactic acid has a weight-average molecular weight of 150,000 or more.

11. The method according to claim 10, wherein the polylactic acid is crosslinked by a crosslinking agent.

12. The method according to claim 11, wherein the crosslinking agent is ethylene glycol or castor oil.

* * * * *